United States Patent Office 3,433,605
Patented Mar. 18, 1969

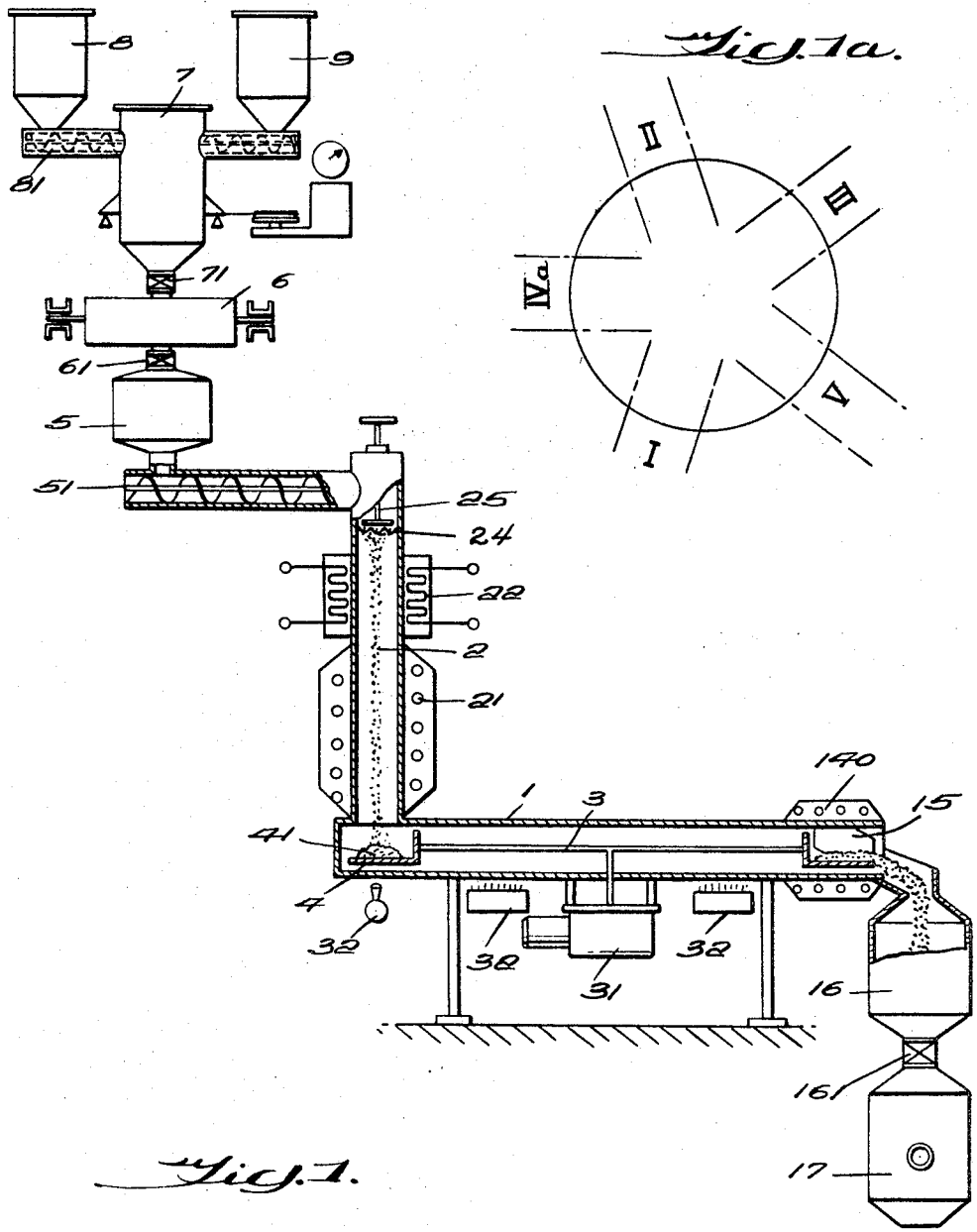

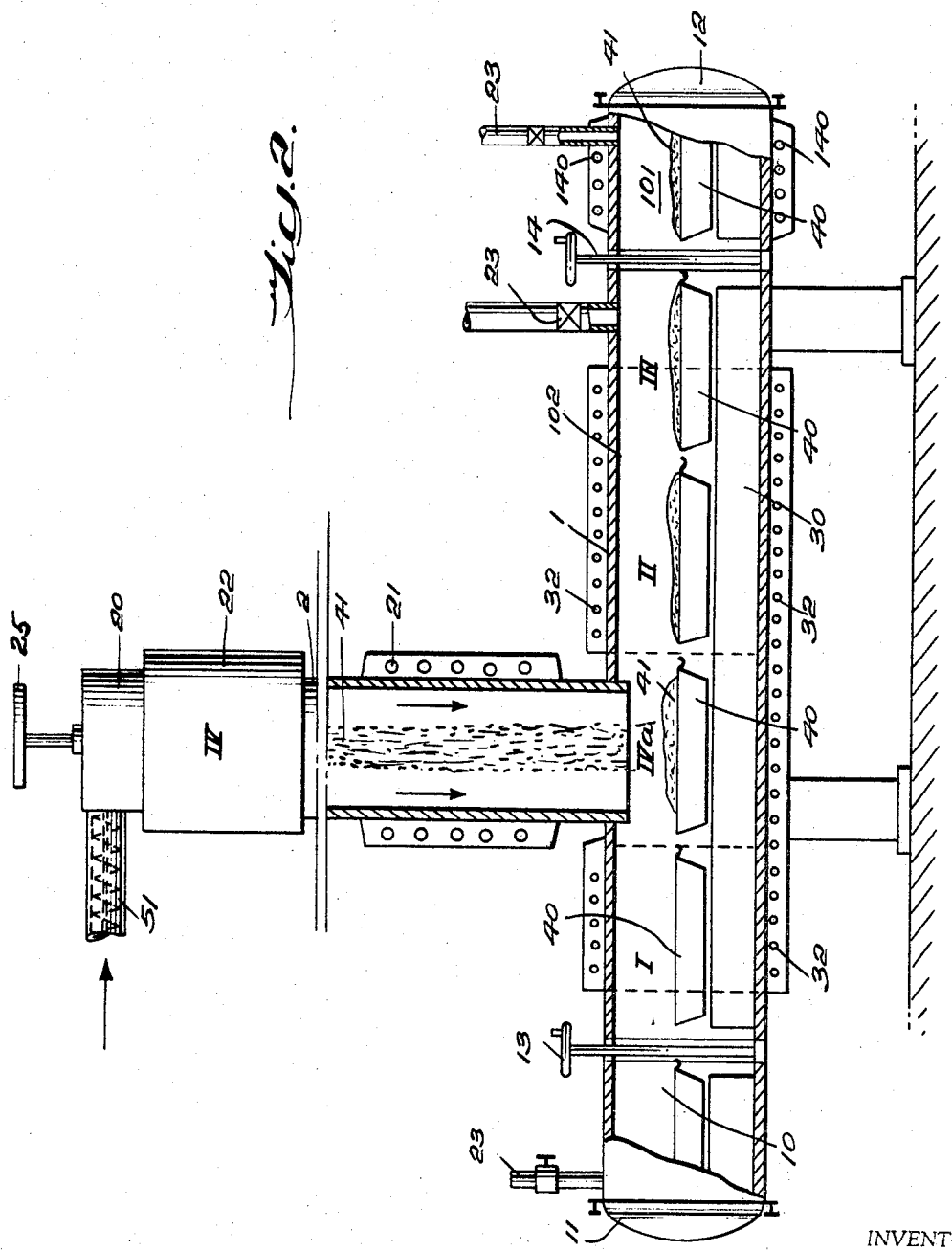

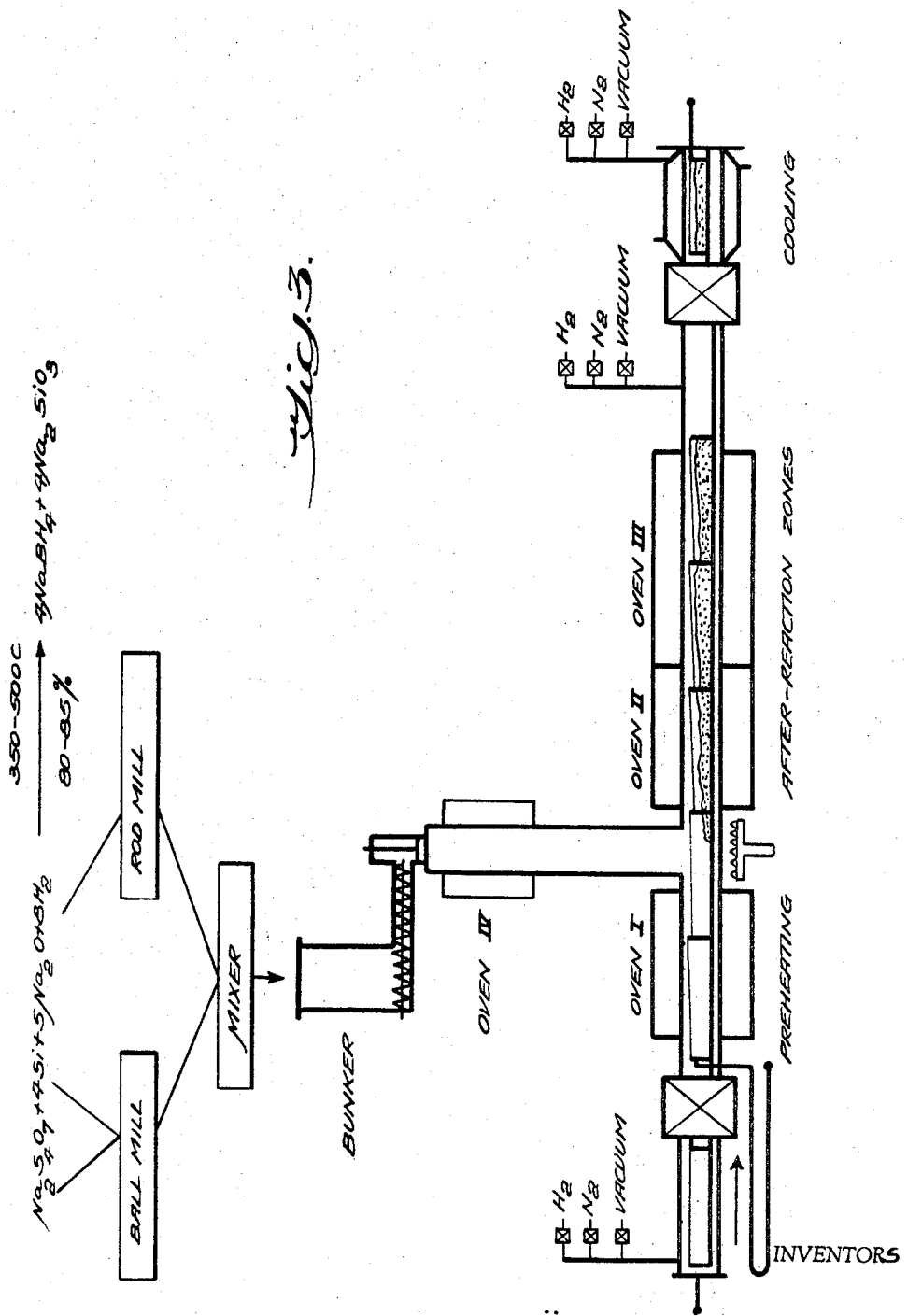

3,433,605
PRODUCTION OF ALKALI METAL
BOROHYDRIDES
Helmut Knorre, Hainstadt (Main), Günther Bretschneider, Gelnhausen, Heinrich Sauer, Grossauheim, and Karl Stephan, Frankfurt am Main, Germany, assignors to Deutsche Gold- und Silber-Scheideanstalt vormals Roessler, Frankfurt am Main, Germany
Filed July 12, 1965, Ser. No. 471,297
Claims priority, application Germany, July 10, 1964,
D 44,905
U.S. Cl. 23—361 6 Claims
Int. Cl. C01b 6/14

ABSTRACT OF THE DISCLOSURE

A method of producing alkali metal borohydride wherein an intimate finely divided mixture of (1) alkali metal and/or alkali earth metal borate, (2) $Na_2O$ and (3) reducing metal is permitted to fall down freely through an elongated upright reaction chamber containing hydrogen while supplying heat from an external source only to a limited portion of the upper end of the reaction chamber just sufficient to ignite the mixture falling therethrough, permitting the heat of reaction of the falling ignited mixture to dissipate as it freely falls through the lower unheated portion of the reaction chamber so that the temperature of such falling mixture does not exceed 550° C. and collecting the reacted material at the lower end of the reaction chamber.

---

The present invention relates to an improved process for the production of alkali metal borohydrides and particularly sodium borohydride or reaction mixtures containing the same and more particularly relates to a continuous process in which alkali metal and alkaline earth metal borate—sodium monoxide mixtures are treated in the presence of hydrogen with reducing substances the oxides of which are not reduced by hydrogen under the conditions of the reaction, especially silicon at elevated temperatures under atmospheric to moderately raised pressure.

It is known that borohydrides can be produced by the reduction of alkali metal metaborates with the aid of aluminum, silicon or their alloys or other substances the oxides of which are not reduced by hydrogen under the conditions of the reaction. These processes, however, required such high temperatures that the decomposition temperature of the alkali metal borohydrides at atmospheric pressure was exceeded to a substantial extent so that as compensation a high hydrogen pressure was required. Reaction conditions, such as, gauge pressure of 60 to 300 atmospheres and temperatures up to 800° C. have been given for such processes. Preferably gauge pressures of 60 to 80 atmospheres at temperatures of 570 to 750° C. have been used to obtain corresponding yields of the borohydrides. The inherent result of these relatively extreme reaction conditions is that the processes can only be carried out discontinuously and that the apparatus is very expensive because of the necessary massive construction.

It has already been proposed in U.S. application Ser. No. 309,279, filed Sept. 16, 1963, to carry out such a solid phase reaction at normal pressure at temperatures up to a maximum of 550° C. by starting from alkali metal or alkaline earth metal borates having a molar ratio of $Me^I_2O$ or $Me^{II}O:B_2O_3$ of less than 3:1, preferably $NaBO_2$ or $Na_2B_4O_7$ and mixing 1 to 1.3 mol of sodium monoxide, as such, per gram atom of boron therewith. The reducing agents employed are substances whose oxides are not reduced by hydrogen under the conditions of the reaction, preferably silicon, ferrosilicon, aluminum or alloys containing such substances. Very strong exothermic reactions are encountered during the reaction of the extremely finely divided mixtures with hydrogen and as a result thereof when reactions of larger quantities of the materials are concerned they must be divided into small partial reactions, for example, by dusting the mixture continuously into a closed preheated reaction space standing under hydrogen, preferably into a heated band or plate in order to effect the reaction and after completion of the reaction continuously removing the reacted mixture from the reaction space. In order to attain good yields under the relatively mild conditions employed, it is necessary that agglomeration of the finely divided mixture into large aggregates is avoided as these would cause overheating and decreases in yield, but, on the other hand, the particles must have sufficient contact in order to be able to react quantitatively. The very exact regulation of the introduction of the solid reactants and of the withdrawal of the reaction product required causes difficulties.

It is an object of the present invention to provide a process and an apparatus for the continuous or discontinuous production of alkali metal borohydrides or reaction mixtures containing such borohydrides by the reaction of alkali metal or alkaline earth metal borate-sodium monoxide mixtures with reducing substances, the oxides of which are not reducible with hydrogen under the conditions of the reaction, preferably silicon, at temperatures between 100° C. and 500° C. at normal to moderately raised pressures, for example, up to about 10 atmospheres which prevent overheating of the reaction mixture and also permit optimal throughput while avoiding the above mentioned difficulties.

The invention is characterized in that reaction is initiated in very finely divided and intimate mixtures of alkali metal or alkaline earth metal borates having a molar ratio of $Me^I_2O$ or $Me^{II}O:B_2O_3$ less than 3:1, preferably 1:1 or 1:2 with 1.0 to 1.3 mol of sodium monoxide per gram atom of boron and 1 to 1.2 mol of silicon or other reducing metal per gram atom of boron in the presence of hydorgen while such mixture drops through an extended space.

According to the invention the very finely divided intimate mixture of the borate with the sodium monoxide and the silicon is dusted into a suitable upright reaction chamber, for example, about 4 meters high maintained under hydrogen, the upper end of which is maintained at the "ignition temperature" with heat supplied from an external source whereas no heat is supplied from an external source to the space therebelow or such lower space is even cooled. Conveyor means are provided at the lower end of such chamber to receive and remove the reaction mixture which has dropped through the chamber.

The heating of the upper end of the chamber through which the finely divided reaction mixture is permitted to fall is such that it just "ignites" and subsequently on falling through the unheated or cooled zone therebelow gives off the excess heat from the ensuing exothermic reaction to the hydrogen contained therein as well as to the water confining the unheated space. The temperature required in the upper end of the reaction chamber for the "ignition" of the reaction mixture depends upon the dimensions of the reaction chamber and the composition of the reaction mixture. Such temperature is usually between about 300° C. and 550° C. In general the temperature provided in the ignition zone is just sufficient to effect ignition of the reaction mixture passing therethrough reliably and such temperature is easily ascertained by routine tests.

A rotary plate can expediently be used as the conveyor means arranged at the bottom of the reaction chamber in which the reaction is initiated. The bottom end of the reaction chamber can also be connected to a conveyor tunnel through which one or more vessels which receive the reaction mixture falling to the bottom of the reaction chamber are passed. Preferably the reaction mixture, after leaving the bottom of the upright reaction chamber, is passed through, for instance, several zones maintained at 450 to about 520° C. during a period of about 2–3 hours to promote completion of the reaction and therefore improve the yield, then, if desired, through a cooling zone and then discharged to a collecting container. When vessels are used to receive the reaction mixtures leaving the bottom of the upright reaction chamber it is advantageous if they are introduced into and withdrawn from the apparatus through air locks.

It was surpringly found that the mode of initiating the reaction, by supply of heat from an external source in the upper end of the elongated upright reaction chamber while permitting the reaction mixture to fall through such chamber and pass through the lower unheated portion, after initiation of the reaction, suffices to attain adequate control of the heat of reaction as it was found that the normally difficult to control heat of reaction is liberated rapidly right after initiation of the reaction in its first stage and such heat of reaction can be dissipated during the few seconds the suspended reaction mixture, in which reaction has just initiated, drops through the lower unheated end of the reaction chamber and before it is connected and conveyed away from the bottom of the upright reaction chamber. The required length of the unheated lower portion of the reaction chamber for the particular reaction mixture concerned, its rate of supply and the other dimensions of the reaction chamber as well as whether special cooling is provided is easily determined by routine tests. In general it must be sufficiently long that the reaction has proceeded sufficiently far that the initial rapid release of exothermic heat of reaction has subsided sufficiently that when such reaction mixture is collected in a receiver at the bottom of the reaction chamber no internal build up of heat occurs so as to cause the temperature to rise above 550° C.

The "ignition" of the reaction mixture as it falls through the upper end of the upright reaction chamber is effected especially advantageously if small quantities (1 to 2%) of substances containing water of crystallization, for example, $Na_2B_4O_7.4H_2O$ or $Na_2B_4O_7.10H_2O$, are added to the reaction mixture. This causes a reduction in the ignition temperature so that the heat build up therefrom by the heat of reaction set free does not lead to overheating. The water of crystallization undergoes a strong exothermic reaction with the $Na_2O$ and this auxiliary reaction causes the "ignition" to occur at relatively low temperatures. Similarly, addition of small quantities of NaOH (about 1 to 2%) also promote initiation of the reaction. The "ignition" of the reaction mixture referred to herein is intended to signify the initiation of the self-propagating exothermic reaction which occurs in the first phase of the reaction.

In contrast to other known processes for the production of alkali metal borohydrides, the process according to the invention can be carried out in practically any desired magnitude or volume because of the mild and easily controlled reaction conditions and the simple apparatus required.

The accompanying drawings show several embodiments of apparatus suitable for carrying out the present invention.

In such drawings:

FIG. 1 diagrammatically shows one form of apparatus suitable for carrying out the process according to the invention, partially in section;

FIG. 1a schematically indicates the various locations of the various stations through which a section of the rotating plate conveyor passes;

FIG. 2 diagrammatically shows another embodiment of an apparatus according to the invention, partially in setcion; and FIG. 3 is a flow sheet schematically illustrating the process as carried out in an apparatus according to FIG. 2.

In FIG. 1 reaction chamber 2, for example, about 4 meters high, is provided at its upper end (zone IV) with a heater 22 about 1 meter high which serves to initiate the reaction in the reaction mixture introduced into the top of such chamber. The lower end of the upright reaction chamber is provided with a cooler 21 which, if necessary, can serve to remove excess exothermic heat of reaction. A sieve 24 provided with a blade stirrer 25 is located in the upper end of the reaction chamber spaced above heater 22. A circular conveyor 1 is connected to the bottom of the upright reaction chamber which is heated in its outer annular zone by heating elements 32, for example, gas burners to various temperatures in the zones of stations I, II, III and cooled by cooler 140 in the zone of the discharge station V. A rotating plate 3 with receiving arrangement 4 for the reaction mixture 41 is provided in such circular conveyor 1. The rotating plate 3 is driven by motor 31. The heating element 32 for station I serves to preheat the portion of receiver 4 which is about to receive the partially reacted reaction mixture leaving the bottom of reaction chamber 2 when in station IVa. Heating elements 32 for stations II and III serve for the thermal after treatment of the partially reacted reaction mixture being passed therethrough. Conveyor 1 is also provided with inlets for nitrogen and hydrogen (not shown) and with an outlet not shown connected to an exhaust system. Reaction chamber 1 is connected over screw conveyor 51 to a supply bunker 5 which preferably always contains only a small quantity of the intimately mixed, comminuted and very reactive reaction mixture. The supply bunker 5 is supplied with such reaction mixture from an intensive mixer 6 over a closure 61. Intensive mixer 6 is connected over closure 71 with a weighing bunker 7 which is supplied with sodium monoxide and alkali metal borate—silicon mixture from bunkers 8 and 9 by screw conveyors 81 and 91. A receiving vessel 16 is provided at the discharge station V of the circular conveyor. A cooler 140 is provided in the region just ahead of such discharge station. Such receiving vessel 16 is connected with a storage vessel for the reacted material over a closure 161. The reacted material is removed from the rotating plate and directed into the receiving vessel by stripper 15.

In the apparatus shown in FIG. 2, the reaction chamber 2 and the heating and cooling arrangements for such chamber as well as the supply arrangements are the same as in the apparatus shown in FIG. 1, but such apparatus includes a different conveyor arrangement 1'. In general the same reference numerals are given for the same elements as in FIG. 1. The reaction mixture 41 leaving the bottom of reaction chamber 2 is taken up in pans 40 which are moved automatically or semi-automatically (by means not shown) through the zones of stations I, IVa, II, III and V of the conveyor arrangement. Empty pans 40 are introduced into the tunnel shaped conveyor chamber 102 through air lock 10 provided with closures 11 and 13 and after being preheated (station I) and filled with the reaction mixture in station IVa are passed through stations II and III and then removed through air lock 101 (station V) provided with closures 14 and 12 and cooler 140. The heat for stations I, II and III is provided by heater 32'. Conduits 23 are provided for introduction and removal of nitrogen, hydrogen as well as for the provision of a vacuum, in order to be able to provide the necessary hydrogen for the reaction as well as to permit introduction and withdrawal of the pans from chamber 102 without having air gain access thereto.

In carrying out the process according to the invention which replaces the conventional 2 step process involving the following separate reactions (I)          $1/4(Na_2B_4O_7+Na_2O \rightarrow 4NaBO_2)$ and (II)   $NaBO_2+Na_2O+Si+2H_2 \rightarrow NaBH_4+Na_2SiO_3$ by a single step process which starts from a commercial water free or substantially water free sodium tetraborate and involves the following reaction (III) $1/4Na_2B_4O_7 + 5/4Na_2O + Si + 2H_2 \rightarrow NaBH_4 + Na_2SiO_3$ $\Delta H° = 90.5$ kcal./mol $NaBH_4$ The reaction conditions employed according to the invention which have been developed for the reaction concerned which proceeds with release of substantially greater exothermic energy than that of the prior processes, render it possible to obtain reproducible reaction yields of about 80 to 90%, 85% as average, of theory based on B.

Preheating station I in which the receivers for the reaction mixture, such as crucibles, pans, conveyor bands, rotary plates, are preheated preferably is maintained at a temperature of about 300° C. The ignition temperature in the upper part of the upright reaction chamber 2 (zone IV) preferably is about 450 to 480° C. The after reaction is effected in the zones of stations II and III in conveyor chamber 102 at temperatures of about 450 to a maximum of about 520° C. The starting reaction mixture preferably is of $Na_2B_4O_7:Na_2O:Si$ in a molar ratio of 1:5:4 (with a 5% excess of the Si). The fineness of the ground starting materials expediently is 1 to $5\mu$, preferably about $2\mu$, for the silicon, and 1 to $5\mu$ for the main portion of the borate and up to $10\mu$ for the main portion of the sodium monoxide.

The following example will serve to illustrate the process according to the invention carried out in an apparatus as shown in FIG. 2 and according to the flow sheet of FIG. 3.

Example 12.360 kg. of silicon (95%) and 20.130 kg. of water free sodium tetraborate were finely ground together and intimately mixed in a ball mill under a nitrogen atmosphere for 6 hours. To avoid a build up of static charges during the grinding the mill was well grounded.

1.625 kg. of the silicon-borate mixture thus prepared were introduced charge wise together with 1.550 kg. of sodium monoxide, which had been finely ground in a rod mill, into a mixer 6 over weighing bunker 7 and after the intensive mixing thereof such mixture was introduced into supply bunker 5 under total exclusion of moisture. (Such finished mixture could be stored for weeks under exclusion of moisture, if so desired, without occurrence of a reaction.)

In order to be able to start operation of the process the apparatus was first evacuated and then filled with hydrogen (at a gauge pressure of 50 mm. Hg) and the zone of station I was preheated to about 300° C. and the ignition zone IV in reaction chamber 2 preheated to about 450° C. When pan 40 in zone I was sufficiently preheated it was transferred to the zone of station IVa to be in position to receive the reaction mixture when it had fallen through chamber 2. After such preparations had been completed the hydrogen pressure in the apparatus was raised to about 1 atmosphere gauge pressure and then screw conveyor 51 was put into operation to transfer the reaction mixture from supply bunker 5 to the top of the upright reaction chamber 2 over sieve 24. In order to assure uniform introduction and distribution of the finely divided powdery reaction mixture, which has a decided influence on the yields obtained, a blade stirrer 25 was provided over the sieve in order to ensure uniform passage of the reaction mixture therethrough whereupon it fell freely through upright reaction chamber. As soon as the free falling reaction mixture reached the ignition zone IV it ignited causing its temperature to rise but on further passage down through the unheated portion of the reaction chamber the excess heat of reaction was dissipated by heat exchange with the hydrogen and the walls of the reaction chamber. The partially reacted reaction mixture falling out of the bottom of reaction chamber was received by a pan 40 stationed therebelow. When such pan had been filled it was transferred sequentially to after reaction zones in stations II and III and replaced by an empty pan which had been preheated in the zone of station I. The temperature reached in station III was 520° C. as a maximum. After completion of the reaction the pan was transferred into cooled air lock 101 which after closure 14 had been closed was evacuated then filled with pure nitrogen and closure 12 opened to permit removal of the pan with its reacted contents.

The described sieving of the reaction mixture introduced into the top of the reaction chamber provided for uniform distribution of the uniformly fine particles for initiation of the reaction as they fell through ignition zone IV and furthermore provided for deposit of the partially reacted material in the receiving pans in a very loose porous state so as to permit good penetration and hydrogenation even at the low hydrogen pressures used. The hydrogen consumption depended upon the rate of supply of the reaction mixture as well as the conversion attained.

The porous gray product obtained was placed in storage containers when it was later to be used as such or supplied to an extraction plant where the NaBH was extracted with n-propyl amine in a closed system with about a 95–96% yield and a 96–98% purity.

The sodium borohydride content was determined gas volumetrically in a manner known per se by reaction with water according to the following equation $$NaBH_4 + 2H_2O \xrightarrow{H+} NaBO_2 + 4H_2 \uparrow$$

Analogously, the reaction was carried out using 80% FeSi instead of the 95% silicon. In this instance about a 10% FeSi excess was required instead of the 5% with the silicon of higher purity.

Also analogously the reaction was carried out using a mixture of 19.930 kg. of water free sodium tetraborate and 372 g. of borax instead of the 20.130 kg. of water free sodium tetraborate. In this instance it was desirable to initiate the reaction of the reaction mixture as soon as practical after finely divided $Na_2O$ had been intimately mixed therewith. Also in this instance the ignition temperature employed was about 200° C. so that the heat of reaction liberated at the beginning of the reaction was less likely to cause overheating.

We claim:

1. In a process for the production of an alkali metal borohydride by reaction of hydrogen with an intimate mixture of (1) a finely divided borate composition selected from the group consisting of alkali metal borates, alkaline earth metal borates and mixtures thereof, the molar ratio of metal oxide to $B_2O_3$ in said borate composition being less than 3:1, (2) finely divided $Na_2O$ and (3) a finely divided reducing metal, the oxide of which is not reducible with hydrogen under the conditions of the reaction, at a pressure between atmospheric and about ten atmospheres gauge pressure at a temperature, not exceeding about 550° C., sufficient to effect the reaction of the hydrogen with said mixture, the steps of permitting said intimate mixture of finely divided substances to fall freely through an elongated upright reaction chamber containing hydrogen while supplying sufficient heat from an external source only to a limited portion of the upper end of the reaction chamber just sufficient to ignite the intimate mixture as it falls therethrough and permitting the exothermic heat of reaction released from the ignited mixture as it falls through the lower end of the reaction chamber, which is not supplied with heat from an external source, to dissipate sufficiently that the reaction temperature of such free falling ignited mixture does not exceed about 550° C. and collecting the mixture leaving the bottom of the upright reaction chamber on a support, the length of said lower unheated portion of the reaction chamber being sufficient that the initial phase of rapid release of exothermic heat of reaction from the ignited mixture has substantially subsided before it is collected.

2. The process of claim 1 comprising in addition the step of maintaining the collected mixture under hydrogen at a temperature of about 420–500° C. for a period of at least about 2–3 hours.

3. The process of claim 1 in which the average particle size of borate composition, $Na_2O_2$ and reducing metal is below 10μ.

4. The process of claim 3 in which said reducing metal is silicon.

5. The process of claim 4 in which said borate composition is anhydrous sodium tetraborate.

6. The process of claim 4 in which said borate composition is a mixture of anhydrous sodium tetraborate with about 1 to 2% of sodium tetraborate containing water of crystallization.

References Cited

UNITED STATES PATENTS

| | | | |
|---|---|---|---|
| 2,429,980 | 11/1947 | Allison | 23—1 X |
| 2,551,905 | 5/1951 | Robinson | 23—1 X |
| 3,164,441 | 1/1965 | Goerrig. | |
| 3,259,474 | 7/1966 | Broja et al. | |
| 3,279,891 | 10/1966 | Wenzel | 23—204 |

OSCAR R. VERTIZ, *Primary Examiner.*

G. O. PETERS, *Assistant Examiner.*

U.S. Cl. X.R.

23—1, 283